United States Patent

Glissendorf

[15] 3,700,053
[45] Oct. 24, 1972

[54] WEIGHT-INDICATING TRAILER COUPLER

[72] Inventor: Wilmer E. Glissendorf, Phoenix, Ariz.

[73] Assignee: Advanced Management Engineering & Research Company, Phoenix, Ariz.

[22] Filed: Dec. 6, 1971

[21] Appl. No.: 204,967

[52] U.S. Cl. .................. 177/136, 177/164, 177/225, 177/230, 177/245, 280/477
[51] Int. Cl. ...... G01g 3/08, G01g 19/08, G01g 23/14
[58] Field of Search .......... 177/136, 1, 139, 145, 146, 177/151–153, 137, 138, 225, 229, 164, 163, DIG. 8, 230, 232–234, 245; 280/477

[56] References Cited

UNITED STATES PATENTS

| 245,201 | 8/1881 | Mills | 177/139 |
| 1,266,881 | 5/1918 | Taylor | 177/234 |
| 2,135,972 | 11/1938 | Garlinger | 280/477 |
| 3,650,340 | 3/1972 | Bradley | 177/136 |

Primary Examiner—Robert S. Ward, Jr.
Attorney—David H. Semmes

[57] ABSTRACT

A weight-indicating trailer coupler for visually indicating actual tongue weight or tongue load of a trailer which is applied to a tow car hitch, during loading, after loading, or after rearranging a load, for the purpose of insuring safe towing through application of adequate weight on the tongue and tow car hitch ball. Actual tongue weight may be read off of a calibrated scale. The coupler consists of two pivotally engaged portions, one of which is attached to a trailer tongue, and the other portion being pivotable with respect to the first portion, against the action of a predetermined strength spring means interposed therebetween, to indicate tongue load visually on a scale.

9 Claims, 7 Drawing Figures

INVENTOR
WILMER E. GLISSENDORF

ATTORNEY

INVENTOR
WILMER E. GLISSENDORF

ATTORNEY

INVENTOR
WILMER E. GLISSENDORF

ATTORNEY

WEIGHT-INDICATING TRAILER COUPLER

BACKGROUND OF THE INVENTION

Safe towing of trailers by two vehicles requires adequate weight on the tongue as applied to a tow car hitch ball or the like. It is extremely difficult for a user to determine what tongue weight is being applied or exists when a trailer is loaded and ready for the road. This problem is accentuated under conditions of use by inexperienced persons, and is especially prevalent in the field of rental trailers. Such rental trailers, for example, normally include a decal, or other marking, affixed to the trailer adjacent the tongue which indicates a minimum weight to be applied on the tow car hitch in pounds. The user, however, has no way of determining, except perhaps through experience, the actual or probable tongue weight or load on a tow car hitch.

BRIEF DESCRIPTION OF THE INVENTION

The present invention is for a weight-indicating trailer coupler which includes a pivotable portion which, in conjunction with spring means, reacts to tongue load or weight, and the actual tongue weight of a trailer as applied to a tow vehicle hitch can be read off of a calibrated scale. Specifically different spring means and/or scale indicators can be used, and the invention insures that adequate weight on the tongue exists to insure proper towing with safety. A trailer user can readily determine the weight applied on the tow car hitch regardless of the type springing suspension on a tow vehicle, and the invention is operable at any time, during loading, after loading, or after rearranging a load. The invention is a convenient aid to safe towing and is especially useful for inexperienced users and/or rental trailer users.

Safety means are incorporated to restrict the amount of movement of the two coupler with respect to one another. The spring means are preferably preloaded to preclude a loose connection, and means are incorporated to lock out or prevent all action or relative movement of the coupler portions if desired.

Additional objects and advantages of the invention will be more readily apparent from the following detailed description of embodiments thereof when taken together with the accompanying drawings in which.

Figure 1:
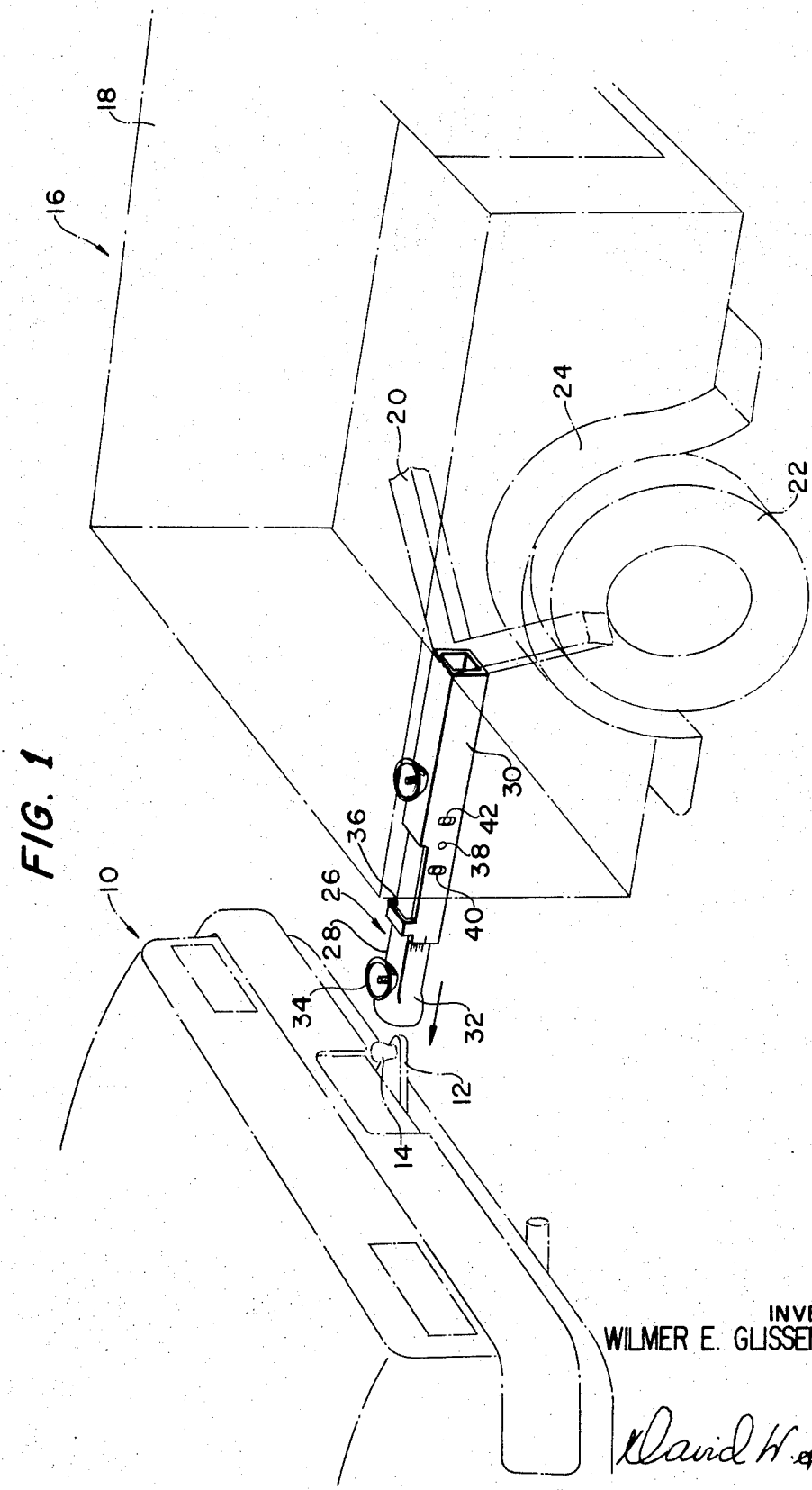
FIG. 1, is a perspective view, partly in phantom, showing the coupler of the invention in one form of interconnecting a tow vehicle and trailer.
Figure 2:
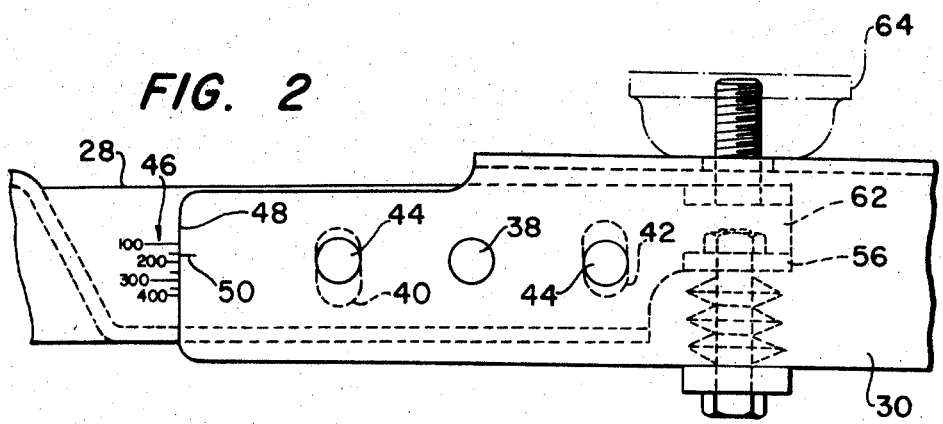
FIG. 2, is a fragmentary side elevational view of the coupler of FIG. 1.
Figure 3:
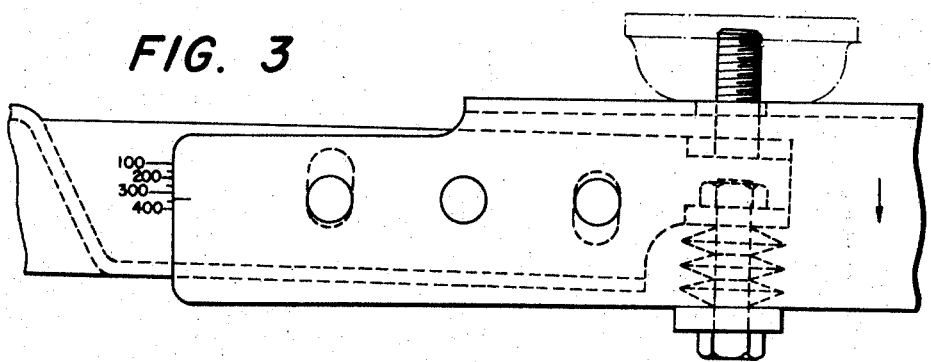
FIG. 3, is a view similar to FIG. 2, indicating a tongue weight or load in the trailer differing from the showing of FIG. 2.

Referring now in more detail to the drawings, a towing vehicle is generally indicated in phantom lines at 10 having a tow hitch 12 including a hitch ball 14, and which construction can consist in any known device. A trailer is generally indicated in phantom lines at 16 including body 18 mounted on chassis frame 20, fragmentarily shown, wheels 22 and fenders 24. The drawings are illustrative only.

Figure 4:
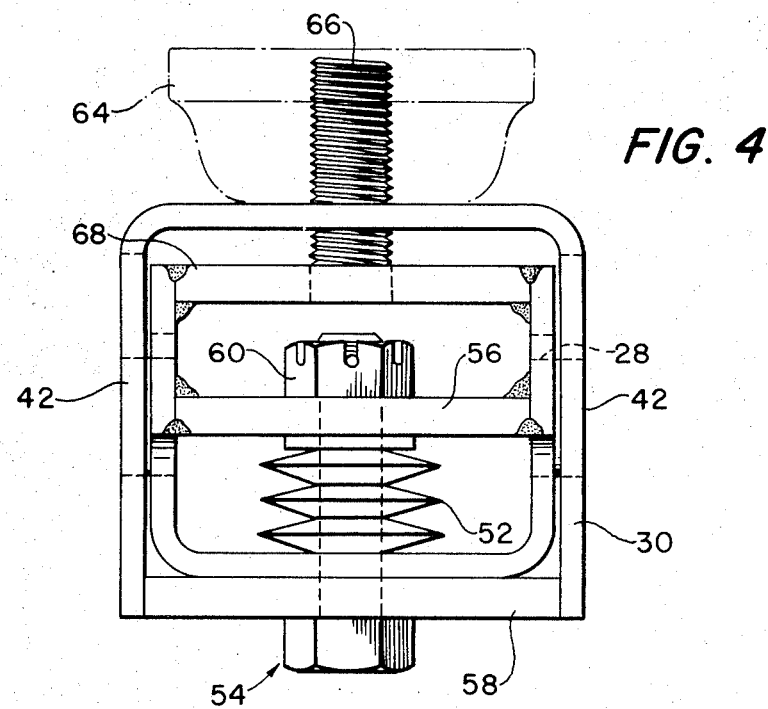
FIG. 4, is an end elevational view disclosing the intercoupling constructional details of the coupler portions.

The weight-indicating trailer coupler of the present invention is generally designated 26, in one form, in FIG. 1. The coupler includes a first or front portion 28 and a second or rear portion 30. A ball coupler 32 of a desired construction is affixed at the forward end of front portion 28 for coacting with ball 14 in a usual manner, and with a securing hand wheel 34 of a usual construction. In the illustrated embodiment of the coupler 32 is of a modified form particularly suitable for use with the invention, and the body of the front portion 28 is of open channel or box shaped configuration as shown in FIG. 4. The second or rear portion 30 of the coupler is also of box or channel configuration having a top cutout portion 36. The aft end of portion 28 is telescopically inserted within rear portion 30 and pivotally interconnected by pivot 38. In a preferred construction bushings such as bronze oilite would be provided at the pivot point, and hardened parts provided at all other wear points. It will be apparent, therefore, that the portions 28 and 30 can pivot with respect to one another for the purpose of indicating tongue weight or load from a trailer with respect to the ball 14 of the hitch on a tow vehicle, as will be more specifically delineated hereinafter.

Fail-safe means between the coupler portions are incorporated, and in the embodiment shown include elongated slots 40, 42 in the sides of coupler portion 30 through which extend fail-safe bolts 44, extending through coacting holes in coupler portion 28. These bolts 44 are preferably secured by lock nuts or castle nuts with cotter keys or the like. These fail-safe bolts serve to restrict the amount of movement between the coupler parts and insure that the coupler can not come apart in the event of failure at the pivot point.

A weight-indicating scale 46 is provided in the embodiment of FIG. 1, on a rear side face of coupler portion 28, with the scale readings being in pounds of tongue weight or load. The leading edge 48 of coupler portion 30 is provided with an indicating point or indicia 50 for coacting with scale 46. In operation, as weight is applied on coupler portion 30 due to trailer load weight, the portion 28 will pivot with respect to portion 30 and the actual tongue weight or tongue load which will be applied to the tow hitch or ball 14 will be indicated by coaction of pointer 50 on scale 46, presenting a visual indication of tongue weight or load on the tow car hitch.

The weighing feature of the invention is accomplished through suitable spring compression means interposed between the coupler portions 28 and 30. In the disclosed embodiment this includes a plurality of Belleville washers 52 mounted on bolt 54 which extends between plate 56 and bottom 58 of tongue portion 30, the plate 56 being affixed to tongue portion 28. The Belleville washers are appropriately arranged in size, and in series or parallel, and installed with some preload through tightening of a bolt 54 and nut 60, the plate 56 being provided on an area 62 of decreased depth on tongue portion 28. A locking hand wheel 64 and coacting bolt 66 affixed to upper plate 68 can be used to lock out all action of the coupler if necessary or desired.

As a trailer incorporating the weight indicating trailer coupler of the invention is loaded, there will be more or less forces exerted on the trailer towing ball by the coupler in a vertical direction. A greater downward force by the trailer tongue will compress the Belleville washers and the actual tongue weight is read off the calibrated scale 46 directly, and vice versa. The pivoting is permitted by the elongated slots 40 and 42, and the compression spring means such as Belleville washers, or other suitable compression spring, is correlated with the calibrated scale for proper tongue load or weight indication. In the event Belleville washers are used the number, arrangement and construction can be varied as required for different load applications.

Figure 7:
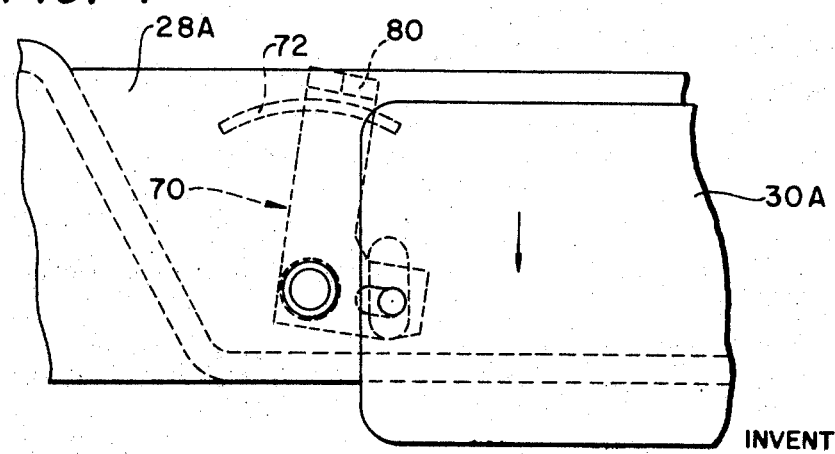
FIG. 7, is a view similar to FIG. 6, disclosing a different tongue weight relationship.
Figure 5:
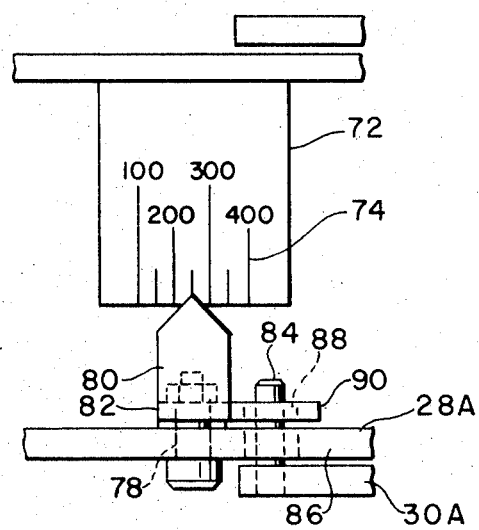
FIG. 5, is a fragmentary top plan view of a coupler with a modified indicator scale.
Figure 6:
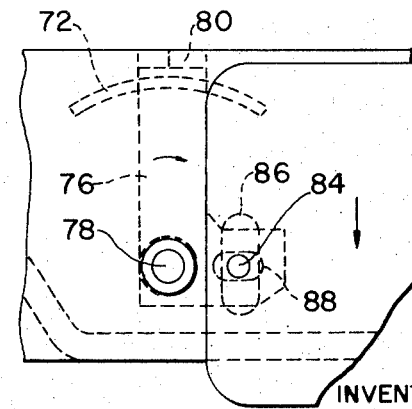
FIG. 6, is a side elevational view of the device of FIG. 5.

FIGS. 5, 6 and 7 disclose a modified form of scale and load indicating mechanism in the nature of a bell crank assembly, generally designated 70. The coupler again consists of portions, 28A and 30A, pivotally interconnected. A curvilinear shaped scale 72 is affixed on a side portion of member 28A in any suitable fashion, with the scale indicia 74 on the upper surface. A bell crank lever 76 is pivotally mounted at 78 on tongue portion 28A, with a pointer 80 attached to leg 82 for coaction with indicia 74 upon movement of the bell crank. A pin 84 is secured to the forward end of tongue portion 30A and extends inwardly through a vertical slot 86 in the side of tongue portion 28A through a horizontal slot 88 in arm 90 of bell crank 76. By coaction of the pin 84 in the slots 86 and 88, the relative movement of tongue portions 28A, 30A in pivoting due to trailer load will transmit movement through bell crank assembly 70 to give a load or weight indication on scale 72. The principle and function are the same as the first described embodiment.

Various details in construction can be effected in the shown and described embodiments without departing from the spirit and scope of the invention as defined in, and limited solely by, the appended claims.

I claim:
1. A weight-indicating trailer coupler comprising:
   A. a front coupler portion adapted for connection with a tow vehicle hitch;
   B. a rear coupler portion adapted for connection with a trailer tongue;
      i. said front and rear coupler portions being pivotally interconnected for relative rotation with respect to one another;
   C. a trailer tongue load indicating scale on one said coupler portion;
   D. a load indicator on the other said coupler portion coactable with said scale; and
   E. spring means interconnected between said front and rear coupler portions, whereby:
      i. amount of trailer load exerted on a tow vehicle hitch through the trailer coupler is translated into a visual tongue weight indication through relative pivotal rotation of said coupler portions, against the action of said spring means, by coaction between said indicator and said scale.

2. A trailer coupler as claimed in claim 1, wherein said spring means comprises a compression spring interposed between said front and rear coupler portions of predetermined load characteristics, said spring being pre-loaded to inhibit loose relative rotation of said coupler portions.

3. A trailer coupler as claimed in claim 2, wherein said compression spring comprises at least one spring washer.

4. A trailer coupler as claimed in claim 3, wherein said spring washer consists of a Belleville washer.

5. A trailer coupler as claimed in claim 4, and including a plurality of coacting aligned washers.

6. A trailer coupler as claimed in claim 2, including a pivot inconnecting said front and rear coupler portions, said portions being at least partially telescopically disposed, the outer of said portions having elongated slots therein longitudinally spaced from said pivot, and bolts secured to the inner of said portions and extending through said slots, and constituting fail-safe bolts which restrict relative rotation of said portions and prevent disassembly of said coupler portions in the event of failure of said pivot.

7. A trailer coupler as claimed in claim 6, and including a threaded bolt secured to the inner of said portions and extending through the outer of said portions, and a hand wheel threadedly engaged with said bolt and operable to securely fix said portions with respect to one another against the action of relative rotation therebetween.

8. A trailer coupler as claimed in claim 1, said scale being on a side surface of said front coupler portion, and said load indicator being on the front portion of said rear coupler portion, relative pivotal rotation of said coupler portions resulting in displacement of said indicator along said scale.

9. A trailer coupler as claimed in claim 1, wherein said scale comprises a curvilinear plate having scale indicia on a surface thereof and mounted on the front said coupler portion, said load indicator including a bell crank pivotally mounted on said front coupler portion and having a pointer on one leg thereof operatively coacting with said scale indicia, the other leg of said bell crank having a longitudinal slot therein, a vertical slot in said front coupler portion and a pin secured to said rear coupler portion extending through the respective slots in said other bell crank arm and said front coupler portion, said slots and said pin coacting upon relative rotation of said coupler portions to move said pointer with respect to said scale for visually indicating tongue weight indication.

* * * * *